United States Patent
Kanagaraj et al.

(10) Patent No.: US 10,421,359 B2
(45) Date of Patent: Sep. 24, 2019

(54) VEHICLE REMOTE START PREVENTION ALERT

(71) Applicant: Panasonic Automotive Systems Company of America, Division of Panasonic Corporation of North America, Peachtree City, GA (US)

(72) Inventors: Padmanaban Kanagaraj, Farmington Hills, MI (US); Katherine Freund, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 32 days.

(21) Appl. No.: 15/797,054

(22) Filed: Oct. 30, 2017

(65) Prior Publication Data

US 2018/0126849 A1 May 10, 2018

Related U.S. Application Data

(60) Provisional application No. 62/419,737, filed on Nov. 9, 2016.

(51) Int. Cl.
| | |
|---|---|
| B60K 28/10 | (2006.01) |
| F02N 11/00 | (2006.01) |
| G06K 9/00 | (2006.01) |
| B60R 25/04 | (2013.01) |
| B60K 28/00 | (2006.01) |

(52) U.S. Cl.
CPC ............ B60K 28/10 (2013.01); B60R 25/04 (2013.01); F02N 11/00 (2013.01); G06K 9/00791 (2013.01); *B60K 2028/003* (2013.01)

(58) Field of Classification Search
USPC .......................................................... 701/2
See application file for complete search history.

(56) References Cited

U.S. PATENT DOCUMENTS

| | | | |
|---|---|---|---|
| 2006/0271246 A1* | 11/2006 | Bell ..................... B60R 25/04 701/1 |
| 2008/0117079 A1* | 5/2008 | Hassan ................ B60R 25/045 340/901 |
| 2012/0212614 A1* | 8/2012 | Oszwald ................. B60R 1/00 348/148 |
| 2018/0126849 A1* | 5/2018 | Kanagaraj ............. B60K 28/10 |

\* cited by examiner

*Primary Examiner* — Tyler D Paige
(74) *Attorney, Agent, or Firm* — Laurence S. Roach, Esq.

(57) ABSTRACT

A motor vehicle includes at least one camera capturing images of an environment outside of the motor vehicle. A proximity sensor detects an object disposed adjacent to the motor vehicle. An electronic processor receives the images captured by the at least one camera, and receives a proximity signal from the proximity sensor. The proximity signal is indicative of whether an object is disposed adjacent to the motor vehicle. The electronic processor determines, based upon the images captured by the at least one camera and the proximity signal, whether the motor vehicle is disposed within an enclosure. The electronic processor receives an engine start request signal that has been wirelessly transmitted by a user. In response to receiving the engine start request signal, the electronic processor causes the engine start system to start an engine of the motor vehicle when the motor vehicle is not disposed within an enclosure.

18 Claims, 2 Drawing Sheets

VEHICLE REMOTE START PREVENTION ALERT

CROSS-REFERENCED TO RELATED APPLICATIONS

This application claims benefit of U.S. Provisional Application No. 62/419,737 filed on Nov. 9, 2016, which the disclosure of which is hereby incorporated by reference in its entirety for all purposes.

BACKGROUND OF THE INVENTION

1. Field of the Invention

The present invention relates to starting motor vehicles via remote control.

2. Description of the Related Art

When a user remotely starts his car, he may be unaware that the car is disposed within an enclosed space. When a vehicle's engine starts within an enclosed space, the space can fill with carbon monoxide, which can be harmful to the user.

SUMMARY OF THE INVENTION

The invention may alert the user before an enclosed space in which a vehicle is disposed becomes filled with carbon monoxide due to the vehicle being remotely started. More particularly, the invention may provide a system within the vehicle that determines if the vehicle is within an enclosed space, such as a garage, and prevents the engine from being started remotely. The inventive system can utilize the vehicle's global positioning system (GPS), front facing camera, rear facing camera, and/or vehicle proximity sensors.

When the vehicle is within an enclosed space and detects that the user is trying to start the engine remotely, the vehicle alerts the user that the engine is being prevented from starting, perhaps also informing the user that the engine is being prevented from starting because the vehicle is in an enclosed space. The user may attempt to remotely start the vehicle by pressing a pushbutton on a key fob associated with the vehicle, for example. The alert may be in the form of a voice message or a text message, and may be communicated to the user via phone app, text alert, smart watch, or smart home system, for example. The alert may be displayed in text form on the user's television. The user can then remotely start the car anyway if he chooses to do so, or he may take some other action such as remotely open a garage door so that the space is no longer enclosed.

The invention comprises, in one form thereof, a motor vehicle including at least one camera capturing images of an environment outside of the motor vehicle. A proximity sensor detects an object disposed adjacent to the motor vehicle. An electronic processor is communicatively coupled to the at least one camera, to the proximity sensor, and to a vehicle engine start system. The electronic processor receives the images captured by the at least one camera, and receives a proximity signal from the proximity sensor. The proximity signal is indicative of whether an object is disposed adjacent to the motor vehicle. The electronic processor determines, based upon the images captured by the at least one camera and the proximity signal, whether the motor vehicle is disposed within an enclosure. The electronic processor receives an engine start request signal that has been wirelessly transmitted by a user. In response to receiving the engine start request signal, the electronic processor causes the engine start system to start an engine of the motor vehicle when the motor vehicle is not disposed within an enclosure. Alternatively, in response to receiving the engine start request signal, the electronic processor informs the user that the engine of the motor vehicle will not be started. The informing occurs when the motor vehicle is disposed within an enclosure.

The invention comprises, in another form thereof, a method of operating a motor vehicle, including capturing images of an environment outside of the motor vehicle. It is detected whether an object is disposed adjacent to the motor vehicle. It is determined, based upon the images captured by the at least one camera and based on the detecting step, whether the motor vehicle is disposed within an enclosure. An engine start request signal wirelessly transmitted by a user is received. In response to receiving the engine start request signal, an engine of the motor vehicle is started when the motor vehicle is not disposed within an enclosure. In response to receiving the engine start request signal, the user is informed that the engine of the motor vehicle will not be started. The informing occurs when the motor vehicle is disposed within an enclosure.

The invention comprises, in yet another form thereof, a motor vehicle including an electronic processor communicatively coupled to a global positioning system. The electronic processor receives geographical coordinates from the global positioning system, and determines, based upon the geographical coordinates, whether the motor vehicle is disposed within an enclosure. The electronic processor receives an engine start request signal wirelessly transmitted by a user. In response to receiving the engine start request signal, the electronic processor causes the engine start system to start an engine of the motor vehicle when the motor vehicle is not disposed within an enclosure. Alternatively, in response to receiving the engine start request signal, the electronic processor informs the user that the engine of the motor vehicle will not be started when the motor vehicle is disposed within an enclosure.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
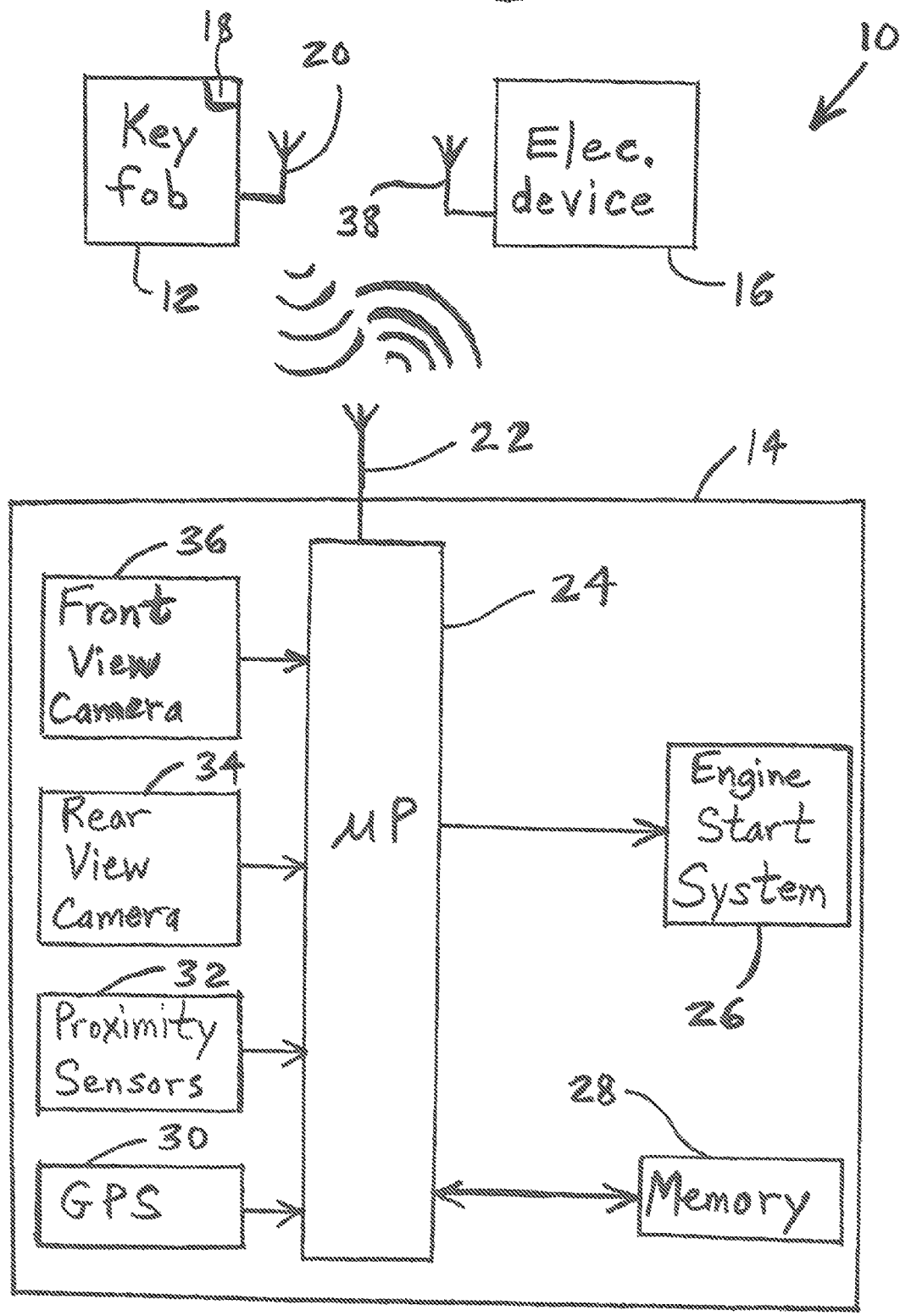
FIG. 1 is a block diagram of one embodiment of a vehicular remote starting arrangement of the present invention.

FIG. 1 illustrates one embodiment of a vehicular remote starting arrangement 10 of the present invention, including a key fob 12, a motor vehicle 14, and a wireless electronic communication device 16. Key fob 12 includes a pushbutton 18 which, when depressed, causes antenna 20 of key fob 12 to transmit a wireless START ENGINE signal to vehicle 14.

Vehicle 14 includes an antenna 22, an electronic processor 24, an engine start system 26, a memory device 28, a GPS module 30, a plurality of proximity sensors 32, rear view camera 34, and a front view camera 36. Antenna 22 enables processor 24 to receive the wireless START ENGINE signal from key fob 12. Upon receiving the wireless START ENGINE signal, processor 24 determines whether vehicle 14 is within an enclosed space, such as a garage.

In order to determine whether vehicle 14 is within an enclosed space, processor 24 may analyze images captured by rear and front view cameras 34, 36, and signals from proximity sensors 32. The images and proximity sensor signal may indicate whether vehicle 14 is surrounded by walls and a ceiling.

Alternatively, processor 24 may use the geographic coordinates of vehicle 14, as received from GPS module 30, to determine whether vehicle 14 is disposed within an enclosed space. Memory device 28 may include a lookup table which indicates which geographic coordinates correspond to an enclosed space. The lookup table may be customized for the particular vehicle, and for the enclosed spaces that the vehicle is regularly parked in. For example, if the images from cameras 34, 36 and/or the proximity sensor signal indicate that vehicle 14 may be surrounded by walls and a ceiling, then processor 24 may textually or audibly ask the user to confirm that vehicle 14 is presently within an enclosed space. The driver's answers and corresponding geographic coordinates may be used to create a database within memory device 28 that lists which geographic coordinates do and do not correspond to enclosed spaces.

It is also possible for the database of enclosed spaces and corresponding geographic coordinates to be disposed remotely, communicated with wirelessly, and be shared by multiple users. Thus, if one user identifies a particular set of geographic coordinates as corresponding to a public garage, then future users do not have to repeat this confirmation that their vehicles are parked in the same garage.

Regardless of how processor 24 determines whether vehicle 14 is disposed within an enclosed space, if processor 24 receives the wireless START ENGINE signal from key fob 12 and determines that vehicle 14 is not disposed within an enclosed space, then processor 24 instructs engine start system 26 to start the engine (e.g., turn ON the ignition). However, if processor 24 receives the wireless START ENGINE signal from key fob 12 and determines that vehicle 14 is disposed within an enclosed space, then processor 24 may transmit via antenna 22 an ALERT signal to electronic device 16.

Electronic device 16 may include an antenna 38 for receiving the ALERT signal from processor 24. Electronic device 16 may be a smart watch, television, personal computer, or mobile telephone, for example. Upon receiving the ALERT signal from processor 24, electronic device 16 may inform the user audibly and/or textually that vehicle 14 is in an enclosed space. If the user does nothing after receiving the ALERT signal, then vehicle 14 is not started. However, the user may override the ALERT signal and cause vehicle 14 to be started, even though vehicle 14 is in an enclosed space. For example, the user may override the ALERT signal by pressing and holding pushbutton 18 for some predetermined period of time, such as five seconds. In response to antenna 22 of vehicle 14 receiving such a wireless OVERRIDE signal from antenna 20 of key fob 12, processor 24 may send a signal to engine start system 26, causing engine start system 26 to start the engine of vehicle 14.

Figure 2:
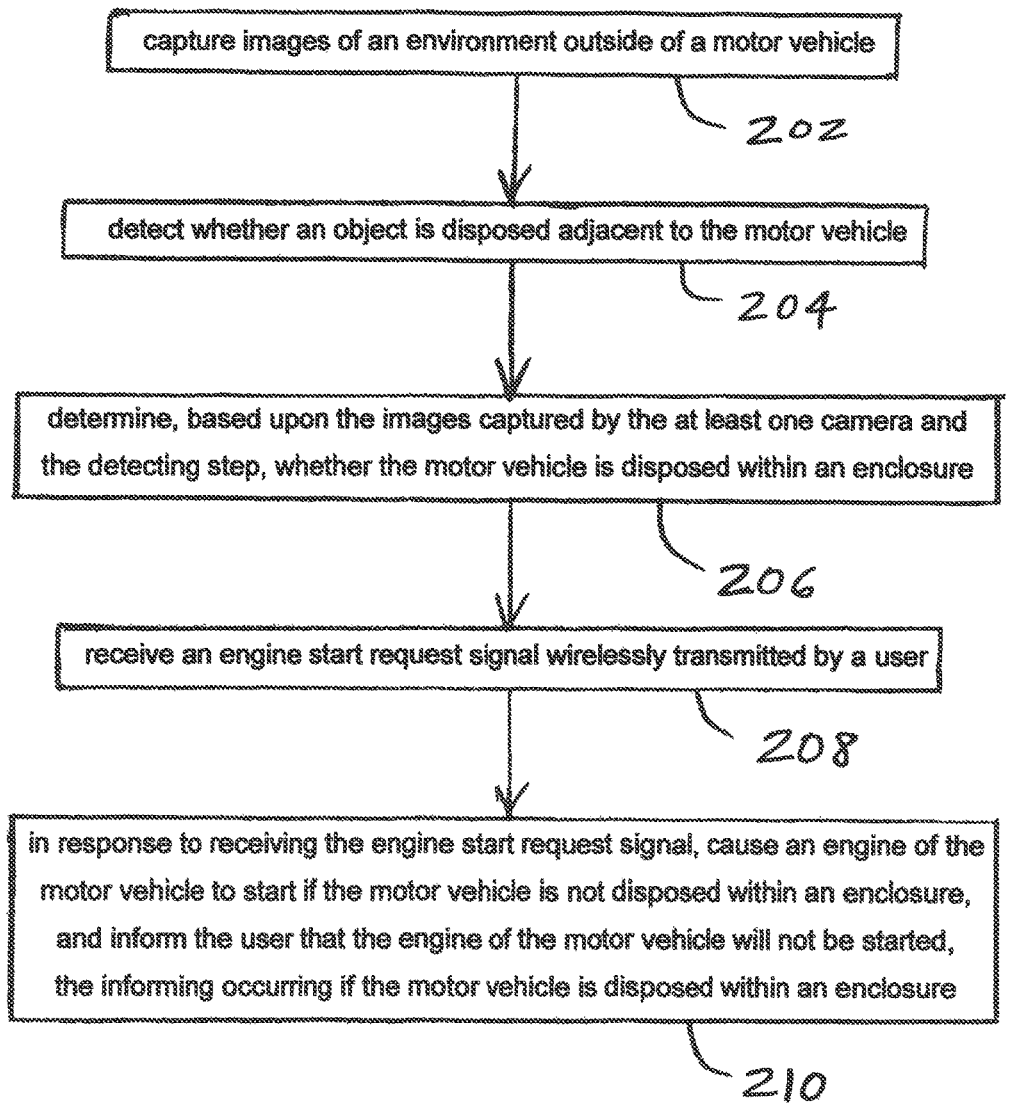
FIG. 2 is a flow chart of one embodiment of a method of the present invention for operating a motor vehicle.

FIG. 2 is a flow chart of one embodiment of a method 200 of the present invention for operating a motor vehicle. In a first step 202, images of an environment outside of the motor vehicle are captured. For example, rear view camera 34 and front view camera 36 may capture images of an environment surrounding vehicle 14.

In a next step 204 it is detected whether an object is disposed adjacent to the motor vehicle. For example, proximity sensors 32 may indicate whether vehicle 14 is disposed adjacent to an object, such as a wall or a ceiling.

Next, in step 206, it is determined, based upon the images captured by the at least one camera and the detecting step, whether the motor vehicle is disposed within an enclosure. For example, processor 24 may analyze images captured by rear and front view cameras 34, 36, and signals from proximity sensors 32. The images and proximity sensor signal may indicate whether vehicle 14 is surrounded by walls and a ceiling.

In step 208, an engine start request signal wirelessly transmitted by a user is received. For example, key fob 12 includes a pushbutton 18 which, when depressed, causes antenna 20 of key fob 12 to transmit a wireless START ENGINE signal, which is received by vehicle 14 via antenna 22.

In a final step 210, in response to receiving the engine start request signal, an engine of the motor vehicle is caused to start if the motor vehicle is not disposed within an enclosure, and the user is informed that the engine of the motor vehicle will not be started if the motor vehicle is disposed within an enclosure. For example, processor 24, in response to receiving the wireless START ENGINE signal, may cause engine start system 26 to start the vehicle's engine if it was determined in step 206 that vehicle 14 is not within an enclosure. Conversely, if it was determined in step 206 that vehicle 14 is indeed within an enclosure, then processor 24 may transmit a wireless signal to electronic device 16 informing the user that the engine of the motor vehicle will not be started.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motor vehicle, comprising:
   at least one camera configured to capture images of an environment outside of the motor vehicle;
   a proximity sensor configured to detect an object disposed adjacent to the motor vehicle;
   an engine start system; and
   an electronic processor communicatively coupled to the at least one camera, the proximity sensor, and the engine start system, the electronic processor being configured to:
   receive the images captured by the at least one camera;
   receive a proximity signal from the proximity sensor, the proximity signal being indicative of whether an object is disposed adjacent to the motor vehicle:
   determine, based upon the images captured by the at least one camera and the proximity signal, whether the motor vehicle is disposed within an enclosure;
   receive an engine start request signal wirelessly transmitted by a user;

in response to receiving the engine start request signal:
cause the engine start system to start an engine of the motor vehicle when the motor vehicle is not disposed within an enclosure; and
inform the user that the engine of the motor vehicle will not be started, the informing occurring when the motor vehicle is disposed within an enclosure;
receive an override signal from the user after informing the user that the engine of the motor vehicle will not be started; and
in response to receiving the override signal from the user, cause the engine start system to start an engine of the motor vehicle.

2. The motor vehicle of claim 1, wherein the at least one camera is configured to capture images of an environment outside of the motor vehicle while an ignition of the motor vehicle is OFF.

3. The motor vehicle of claim 1, wherein the proximity sensor is configured to detect an object disposed adjacent to the motor vehicle while an ignition of the motor vehicle is OFF.

4. The motor vehicle of claim 1, wherein the electronic processor is configured to, in response to receiving the engine start request signal when the motor vehicle is disposed within an enclosure, inform the user that the engine of the motor vehicle will not be started by causing a wireless signal to be transmitted to an electronic device that did not cause the engine start request signal to be wirelessly transmitted.

5. The motor vehicle of claim 1, further comprising a global positioning system communicatively coupled to the electronic processor, the electronic processor being configured to determine, based upon geographical coordinates provided by the global positioning system, whether the motor vehicle is disposed within an enclosure.

6. The motor vehicle of claim 5, further comprising a memory device storing a database of geographical coordinates corresponding to enclosed spaces, the electronic processor being configured to determine whether the motor vehicle is disposed within an enclosure based upon data retrieved from the database.

7. A motor vehicle, comprising:
a global positioning system;
an engine start system; and
an electronic processor communicatively coupled to the global positioning system, the electronic processor being configured to:
receive geographical coordinates from the global positioning system;
determine, based upon the geographical coordinates, whether the motor vehicle is disposed within an enclosure;
receive an engine start request signal wirelessly transmitted by a user;
in response to receiving the engine start request signal:
cause the engine start system to start an engine of the motor vehicle when the motor vehicle is not disposed within an enclosure; and
inform the user that the engine of the motor vehicle will not be started, the informing occurring when the motor vehicle is disposed within an enclosure;
receive an override signal from the user after informing the user that the engine of the motor vehicle will not be started; and
in response to receiving the override signal from the user, cause the engine start system to start an engine of the motor vehicle.

8. A method of operating a motor vehicle, the method comprising:
capturing images of an environment outside of the motor vehicle;
detecting whether an object is disposed adjacent to the motor vehicle;
determining, based upon the images captured by the at least one camera and the detecting step, whether the motor vehicle is disposed within an enclosure;
receiving an engine start request signal wirelessly transmitted by a user;
in response to receiving the engine start request signal:
causing an engine of the motor vehicle to start if the motor vehicle is not disposed within an enclosure; and
informing the user that the engine of the motor vehicle will not be started, the informing occurring if the motor vehicle is disposed within an enclosure;
receiving an override signal from the user after informing the user that the engine of the motor vehicle will not be started; and
in response to receiving the override signal from the user, causing the engine of the motor vehicle to start.

9. The method of claim 8, wherein the capturing step comprises capturing images of an environment outside of the motor vehicle while an ignition of the motor vehicle is OFF.

10. The method of claim 8, wherein the detecting step comprises detecting an object disposed adjacent to the motor vehicle while an ignition of the motor vehicle is OFF.

11. The method of claim 8, wherein, in response to receiving the engine start request signal when the motor vehicle is disposed within an enclosure, the user is informed that the engine of the motor vehicle will not be started, the informing including causing a wireless signal to be transmitted to an electronic device that did not cause the engine start request signal to be wirelessly transmitted.

12. The method of claim 8, wherein the determining step is further based upon geographical coordinates provided by a global positioning system disposed within the motor vehicle.

13. The method of claim 12, wherein the determining step is further based upon data retrieved from a database of geographical coordinates stored in correspondence with garages.

14. A motor vehicle, comprising:
a global positioning system;
an engine start system; and
an electronic processor communicatively coupled to the global positioning system, the electronic processor being configured to:
receive geographical coordinates from the global positioning system;
determine, based upon the geographical coordinates, whether the motor vehicle is disposed within an enclosure;
receive an engine start request signal wirelessly transmitted by a user;
in response to receiving the engine start request signal:
cause the engine start system to start an engine of the motor vehicle when the motor vehicle is not disposed within an enclosure; and
inform the user that the engine of the motor vehicle will not be started, the informing occurring when the motor vehicle is disposed within an enclosure;

receive an override signal from the user after informing the user that the engine of the motor vehicle will not be started; and in response to receiving the override signal from the user, cause the engine start system to start an engine of the motor vehicle.

15. The motor vehicle of claim 14, wherein the global positioning system is configured to produce geographical coordinates while an ignition of the motor vehicle is OFF.

16. The motor vehicle of claim 14, wherein the electronic processor is configured to, in response to receiving the engine start request signal when the motor vehicle is disposed within an enclosure, inform the user that the engine of the motor vehicle will not be started by causing a wireless signal to be transmitted to an electronic device that did not cause the engine start request signal to be wirelessly transmitted.

17. The motor vehicle of claim 14, further comprising a memory device storing a database of geographical coordinates corresponding to enclosed spaces, the electronic processor being configured to determine whether the motor vehicle is disposed within an enclosure based upon data retrieved from the database.

18. The motor vehicle of claim 14, further comprising at least one camera configured to capture images of an environment outside of the motor vehicle, wherein the electronic processor is configured to determine whether the motor vehicle is disposed within an enclosure based further upon the captured images.

* * * * *